US012576560B2

(12) United States Patent
Pavón Vargas et al.

(10) Patent No.: US 12,576,560 B2
(45) Date of Patent: Mar. 17, 2026

(54) METHOD FOR OBTAINING A RECYCLED MATERIAL FROM MULTILAYER PET CONTAINERS AND RECYCLED MATERIAL OBTAINED USING SAME

(71) Applicants: Universitat Politècnica de València, València (ES); ASOCIACIÓN DE INVESTIGACIÓN DE LA INDUSTRIA DEL JUGUETE, CONEXAS Y AFINES (AIJU), Ibi (ES)

(72) Inventors: Cristina Paola Pavón Vargas, Valencia (ES); José Miguel Ferri Azor, Valencia (ES); Joaquín Vilaplana Cerda, Ibi (ES); Santiago Ferrándiz Bou, Valencia (ES); Luis Jesús Quiles Carillo, Valencia (ES); Asunción Martínez García, Ibi (ES); Francisco José Parres García, Valencia (ES); José Enrique Crespo Amorós, Valencia (ES); Harrison De La Rosa Ramírez, Valencia (ES); María Dolores Samper Madrigal, Valencia (ES); Miguel Fernando Aldas Carrasco, Valencia (ES); Daniel García García, Valencia (ES); Juan López Martínez, Valencia (ES)

(73) Assignees: Universitat Politècnica de València, València (ES); ASOCIACIÓN DE INVESTIGACÓN DE LA INDUSTRIA DEL JUGUETE, CONEXAS Y AFINES (AIJU), Ibi (ES)

( * ) Notice: Subject to any disclaimer, the term of this patent is extended or adjusted under 35 U.S.C. 154(b) by 170 days.

(21) Appl. No.: 18/274,750

(22) PCT Filed: Feb. 1, 2022

(86) PCT No.: PCT/ES2022/070049
§ 371 (c)(1),
(2) Date: Jul. 28, 2023

(87) PCT Pub. No.: WO2022/171915
PCT Pub. Date: Aug. 18, 2022

(65) Prior Publication Data
US 2025/0018612 A1 Jan. 16, 2025

(30) Foreign Application Priority Data

Feb. 15, 2021 (ES) .............................. ESP202130117

(51) Int. Cl.
*B29B 17/00* (2006.01)
*B29B 17/04* (2006.01)
(Continued)

(52) U.S. Cl.
CPC ...... *B29B 17/0036* (2013.01); *B29B 17/0412* (2013.01); *B29C 48/022* (2019.02);
(Continued)

(58) Field of Classification Search
CPC ......... B29B 17/00; B29B 17/02; B29B 17/04; B29B 2017/0286; B29C 48/00;
(Continued)

(56) References Cited

U.S. PATENT DOCUMENTS

| | | | | |
|---|---|---|---|---|
| 10,385,183 B2 * | 8/2019 | Maille | ..................... | B29B 17/02 |
| 2014/0024778 A1 * | 1/2014 | Alsewailem | ............ | C08L 23/10 |
| | | | | 525/70 |

(Continued)

FOREIGN PATENT DOCUMENTS

| | | |
|---|---|---|
| CN | 101041725 A | 9/2007 |
| CN | 102432851 A | 5/2012 |

(Continued)

OTHER PUBLICATIONS

CN108641397A English translation prepared Mar. 7, 2025 (Year: 2025).*

(Continued)

*Primary Examiner* — Alison L Hindenlang
*Assistant Examiner* — Shibin Liang
(74) *Attorney, Agent, or Firm* — Collard & Roe, P.C.

(57) ABSTRACT

A method for obtaining mechanically recoverable recycled material from multilayer PET (polyethylene terephthalate) containers of post-consumer and/or post-industrial origin involves cleaning the containers, crushing them into pieces, mixing the pieces with a compatibilizing mixture and melting the mixed product to obtain a continuous filament. The compatibilising mixture is formed by at least: 10-45% thermoplastic polyolefin matrix; a reagent of plant origin in a percentage of less than 7.5% of the total mixture; and a (Continued)

rosin-based tackifier in a percentage of less than 7.5% of the total mixture.

11 Claims, 2 Drawing Sheets

(51) Int. Cl.

| | | |
|---|---|---|
| *B29C 48/00* | (2019.01) | |
| *B29C 48/05* | (2019.01) | |
| *B29B 17/02* | (2006.01) | |
| *B29K 23/00* | (2006.01) | |
| *B29K 67/00* | (2006.01) | |
| *B29K 105/00* | (2006.01) | |
| *B29K 105/26* | (2006.01) | |
| *B29L 9/00* | (2006.01) | |
| *B29L 31/00* | (2006.01) | |

(52) U.S. Cl.
CPC ...... *B29C 48/05* (2019.02); *B29B 2017/0286* (2013.01); *B29B 2017/042* (2013.01); *B29K 2023/06* (2013.01); *B29K 2023/12* (2013.01); *B29K 2067/003* (2013.01); *B29K 2105/0088* (2013.01); *B29K 2105/26* (2013.01); *B29L 2009/00* (2013.01); *B29L 2031/712* (2013.01)

(58) Field of Classification Search
CPC ........ B29C 48/05; B29K 23/00; B29K 67/00; B29K 105/00; B29K 105/26; B29L 9/00; B29L 31/00
See application file for complete search history.

(56) References Cited

U.S. PATENT DOCUMENTS

| | | |
|---|---|---|
| 2019/0111586 A1 | 4/2019 | Hui |
| 2022/0234331 A1* | 7/2022 | Rastorguev ............... B32B 3/30 |

FOREIGN PATENT DOCUMENTS

| | | | | |
|---|---|---|---|---|
| CN | 108641397 | * | 12/2018 | ............ C08L 101/00 |
| CN | 108641397 A | * | 12/2018 | ............ C08L 101/00 |
| EP | 2194089 | * | 9/2010 | ............. C08J 11/06 |
| KR | 10-2010-0025479 A | | 3/2010 | |
| KR | 10-2010-0031791 A | | 3/2010 | |
| WO | 2008/131643 A1 | | 11/2008 | |
| WO | 2019219888 A1 | | 11/2019 | |

OTHER PUBLICATIONS

CN108641397 English translation prepared Jun. 18, 2025.*
International Search Report in PCT/ES2022/070049, mailed May 4, 2022.
EPO—Supplemental European Search Report of Application No. EP 22 75 2379, Dated Mar. 11, 2025.

* cited by examiner

METHOD FOR OBTAINING A RECYCLED MATERIAL FROM MULTILAYER PET CONTAINERS AND RECYCLED MATERIAL OBTAINED USING SAME

CROSS REFERENCE TO RELATED APPLICATIONS

This application is the National Stage of PCT/ES2022/070049 filed on Feb. 1, 2022, which claims priority under 35 U.S.C. § 119 of Spanish Application No. P202130117 filed on Feb. 15, 2021, the disclosure of which is incorporated by reference. The international application under PCT article 21 (2) was not published in English.

OBJECT OF THE INVENTION

The present invention relates to a method for obtaining a recycled material from multilayer PET (polyethylene terephthalate) containers and a compatibilising mixture formed by a thermoplastic polyolefin matrix, a reagent of plant origin, and a tackifier.

The object of the invention is to obtain a recycled material from the plastic waste of multilayer containers which contain a high PET content in order to contribute to the reduced use of chemical recycling and to enable the recovery thereof by degradation-free mechanical recycling.

BACKGROUND OF THE INVENTION

Products manufactured with multilayer PET are mainly used for food preservation. This requires that the container be made up of different materials, for example: PET in the outer layer to provide rigidity, EVOH (acronym for ethylene-vinyl-alcohol) in the intermediate layer which acts as a gas barrier, and LDPE (acronym for low density polyethylene) in the inner layer in contact with food.

Each manufacturer applies different composition and layer specifications to obtain a multilayer PET according to the needs of the product. This combination of different materials in each layer prevents their mechanical recycling due to incompatibility problems between these materials, mechanical recycling which is viable for non-multilayer PET containers.

Therefore, the different fractions that make up multilayer PET containers must be separated (both in post-consumer and post-industrial containers) to prevent contamination in the general recycling of other polymers.

On the other hand, the main problem existing today for recycling multilayer PET containers is that post-consumer rigid container recovery systems in recycling plants are highly optimised to separate the materials into HDPE (acronym for high density polyethylene) and PET plastic fractions. Consequently, after classification, there is a 15-20% multilayer fraction with a high PET content (greater than 50%) that cannot be recycled and ends up in landfill or being incinerated, since it contaminates the other recycled polymer fractions. This problem is alarming since about 800,000 tonnes of this multilayer waste are generated annually in Europe alone.

It should be noted that multilayer PET industrial waste (not post-consumer) is currently not being recovered either by the company itself or by recyclers, due to the mentioned incompatibility between the materials forming the multilayer, giving rise to a large amount of waste material that cannot be recovered and is sent to landfill.

Based on the foregoing, it is concluded that in the field of plastic waste there is a significant technical problem derived from the lack of homogeneity of the plastic materials present. In fact, the heterogeneity of multilayer PET containers is an impediment to their mechanical recycling, and there is currently a need to address the chemical recycling of these materials with a certain technical complexity and environmental impact. In that sense, chemical recycling has the drawback of being less profitable, constituting a disposal system instead of a profitable recovery system.

The applicant of the present patent thus detects the need to provide a method which allows obtaining a mechanically processable recycled material from multilayer PET containers.

DESCRIPTION OF THE INVENTION

The present invention relates to a method for obtaining a recycled material from containers containing a high multilayer PET content, wherein the containers are post-consumer waste and/or post-industrial waste.

Post-consumer waste and post-industrial waste are multilayer waste given that they can be formed from three to eleven layers, with the presence of PET being essential due to its barrier properties, so they are heterogenous waste which contains, in addition to PET, other polymeric materials such as polypropylene, polyethylene, poly (vinyl alcohol), polyamide, etc., according to the type of use for which the container is intended. All these materials are incompatible with one another when being recycled mechanically by direct melting.

In that sense, the present invention proposes obtaining a recycled material, result of the method that is described in detail below, which can be recovered by means of mechanical recycling.

Specifically, the waste involved in the method for obtaining the recycled material is very specific, being essentially leftover film or sheets containing in the composition thereof multilayer PET used predominantly in food.

In other words, the proposed method allows recycling plastic container waste from yellow skips, often classified as miscellaneous, and is not comprised in the PET, HDPE, or LDPE film categories.

The method of the invention comprises the following operative steps:

cleaning the multilayer PET containers to eliminate smell and certain impurities. A soapy solution is used in the cleaning step. In a preferred but non-limiting manner, the cleaning step is performed by means of mechanical stirring and with the multilayer PET containers being subjected to at least 60° C., and wherein the soapy solution is formed by an aqueous solution with 2% soap. The mentioned soap is formed by 15% anionic surfactants and 5% non-ionic surfactants.

separating the film and/or labels of the multilayer PET containers, obtaining a clean multilayer PET material.

crushing the clean multilayer PET material to a size of at least 1 mm. Preferably, in this crushing step the clean crushed multilayer PET material is obtained in the form of flakes with a size smaller than 5 mm by 5 mm.

mixing the clean crushed multilayer PET material in a percentage of 50% to 85% of the total mixture, with a compatibilising mixture formed by at least a thermoplastic polyolefin matrix in a percentage of between 10% and 45% of the total mixture, a reagent of plant origin in a percentage of less than 7.5% of the total mixture, and a rosin-based tackifier (modified pine resins) in a percentage of less than 7.5% of the total mixture.

melting the mixture obtained in the preceding step by means of extrusion at a temperature of between 200° C. and 300° C. to obtain a continuous filament.

Optionally, after the melting step, the method of the invention includes a step of cutting by means of a pellet press to section the continuous filament obtained in the melting step, obtaining thermoplastic chippings.

However, said cutting step can indeed be replaced by a moulding step involving the modelling of the continuous filament obtained in the melting step by means of a nozzle having a configuration such that it allows obtaining thermoplastic sheets and/or profiles directly. Said nozzle will be placed in the head of the extruding machine involved in the melting step.

A recycled material having a highly advantageous behaviour, as concluded from the tests shown in the preferred embodiment section, is obtained by means of the described method.

Said recycled material is formed by clean crushed multilayer PET material and a compatibilising mixture formed by at least a thermoplastic polyolefin matrix, a reagent of plant origin, and a tackifier which is a natural product that improves the binding between the elements involved in the recycled material and acts as a promoting agent.

Specifically, the clean crushed multilayer PET material is in a percentage of 50% to 85% of the total mixture, whereas the compatibilising mixture is formed by at least a thermoplastic polyolefin matrix in a percentage of between 10% and 45% of the total mixture, a reagent of plant origin in a percentage of less than 7.5% of the total mixture, and a rosin-based tackifier in a percentage of less than 7.5% of the total mixture.

The thermoplastic polyolefin matrix is a polyolefin binder which is preferably made up of polyethylene, polypropylene, or a combination of both. Notwithstanding the foregoing, the thermoplastic polyolefin matrix can also be made up of copolymers of ionomers, ethylene-vinyl acetate, or random copolymers of polypropylene.

On the other hand, the reagent of plant origin which is part of the recycled material obtained according to the method object of the present invention can be an epoxidised soybean oil, an epoxidised linseed oil, and/or a maleinised linseed oil. Advantageously, the use of a reagent of plant origin offers a lower environmental impact compared to other reagents of petrochemical origin.

In any case, the recycled material, from multilayer PET containers of post-consumer and/or post-industrial origin, is obtained in a format of a continuous filament generated in the extrusion melting phase, which is easily mouldable or transformable later on.

Specifically, the recycled material can be in a format of thermoplastic chippings or pellets by passing it through a pellet press. Advantageously, the format of thermoplastic chippings of the recycled material obtained enables the modification thereof by means of any subsequent plastic transformation technique, where highly diverse plastic forms: sheets, plates, injected parts, blown parts, etc., can be obtained.

In that sense, there is the option of obtaining the recycled material of the present invention in a format of thermoplastic sheets or profiles when the extruder incorporates a nozzle with the configuration suitable to that end.

Accordingly, the invention provides a solution to problems related to the processing of highly heterogenous multilayer PET containers, the mechanical recycling of which was not feasible up until now. In this way, the method and material object of the present invention lead to the implementation of mechanical recycling, preventing the massive use of chemical recycling, thereby increasing profitability in multilayer PET recovery.

In summary, the invention is presented as a technological option with high added value in technical and environmental terms for the recovery of multilayer containers with a high PET content in their composition, being a uniform material with a quality that is comparable to recycled polyolefins, suitable for use for manufacturing products by conventional mechanical injection or extrusion.

DESCRIPTION OF THE DRAWINGS

To complement the description that will be made below and for the purpose of helping to better understand the features of the invention according to preferred practical embodiments thereof, there is attached as an integral part of said description a set of drawings in which the following is depicted in an illustrative and non-limiting manner.

PREFERRED EMBODIMENT OF THE INVENTION

Two examples of the method for obtaining a recycled material from multilayer PET containers of post-consumer origin (test 1) and from multilayer PET containers of post-industrial origin (test 2) are described in detail below.

Test 1:

Multilayer PET containers of post-consumer origin are used in test 1. Specifically, the recycled material is prepared following the method described in the preceding section, and where preferably two compounds or mixtures (mixture A and mixture B) were elaborated from multilayer PET containers of post-consumer origin prepared according to the recycled material object of the present invention.

In that sense, mixture A and mixture B are obtained based on the use of a twin-screw extruder for the purpose of achieving good mixing and homogeneity of the recycled material obtained.

The table below specifies the elements making up mixture A and mixture B of test 1.

| Elements | Mixture A | Mixture B |
|---|---|---|
| Post consumer multilayer PET containers | 50 | 75 |
| Epoxidised linseed oil | 5 | 3 |
| Rosin | 7 | 3.5 |
| Thermoplastic polyolefin matrix | 38 | 21.5 |

To determine the optimal extrusion temperature, a thermal analysis was previously performed by means of differential scanning calorimetry (DSC) tests on clean multilayer PET containers. On the basis of these tests it is concluded that the melting peak of the different multilayer PET containers is comprised between 247.5 and 249.5. In this sense, it was determined to extrude the different samples of the present tests at 270° C. and 30 rpm, previously drying the material at 60° C. for 24 hours to remove residual moisture and thereby prevent any hydrolytic degradation of the PET.

Figure 1:
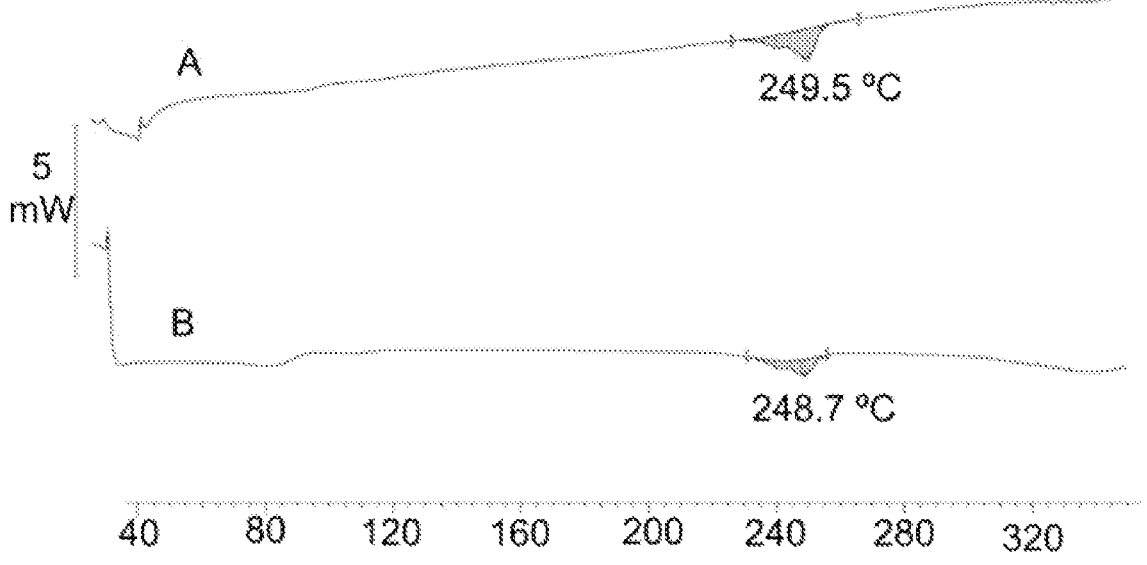
FIG. 1 shows the calorimetric graphs obtained in the tests performed for two preferred embodiments of recycled material obtained according to the method of the present invention.
Figure 2:
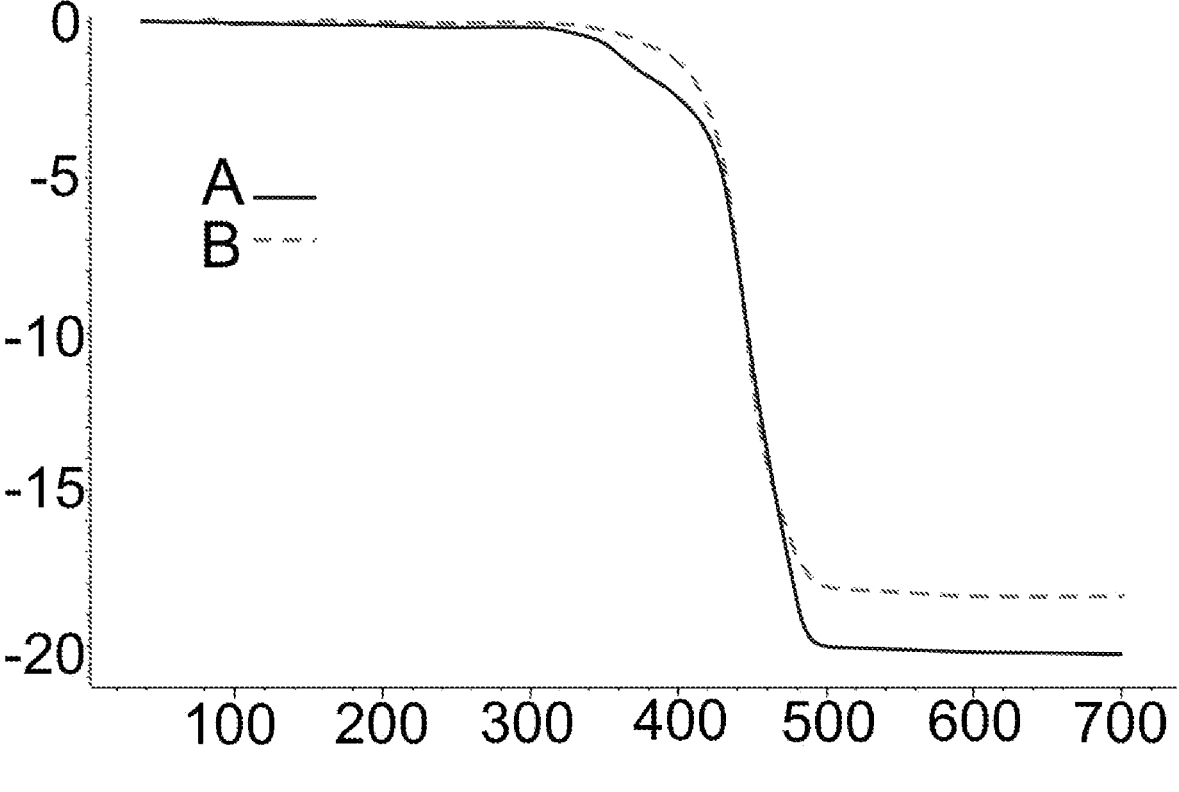
FIG. 2 shows the thermogravimetric analysis results obtained for the tests performed for two preferred embodiments of recycled material obtained according to the method of the present invention.

A thermal characterization is then performed by means of DSC and thermogravimetric analysis TGA on samples A and B prepared according to the method of the present invention. FIGS. 1 and 2 show the DSC and TGA results for mixture A and mixture B of test 1. Specifically, FIG. 1 depicts in the y-axis temperature expressed in ° C., whereas the x-axis represents the thermal energy or heat flow expressed in mW. Any change which alters heat flow to and from the sample due to glass transitions or melting of the material, among others, is detected by means of DSC. On the other hand, FIG. 2 depicts in the y-axis temperature expressed in ° C., whereas the x-axis represents mass loss expressed in mg.

As can be seen in FIG. 1, the melting temperature of mixture A is 249.5° C. and the melting temperature of mixture B is 248.7° C.

Likewise, a mechanical characterization of sample A and sample B is performed, specifically by means of a tensile test (ISO 527, specimen 1BA, 5 kN load cell, and speed of 5 mm/min) and a Charpy impact test (ISO 179, notched. Method of ISO 179-1/1eAb).

Results obtained in the mechanical characterization are included in the following table in which it can be seen that mixture A is more resistant, given the maximum resistance of 25.5 MPa and elastic modulus of 941.5 MPa. Likewise, mixture A presents good elongation at break (63.6%) and the energy absorbed by said mixture in the Charpy impact test is 2.4 KJ/m$^2$.

On the other hand, mixture B shows a more ductile behaviour, given that the elongation at break reaches 361.8% and the energy absorption by means of Charpy impact increases to 5.7 KJ/m$^2$. In contrast, resistance decreases to 14.0 MPa and the modulus also decreases to 143.0 MPa.

| Sample | Maximum resistance (MPa) | Elastic modulus (MPa) | Elongation (%) | Impact energy (kJ/m$^2$) |
|---|---|---|---|---|
| Mixture A | 25.5 ± 1.0 | 942 ± 219 | 63.6 ± 24.2 | 2.4 ± 0.2 |
| Mixture B | 14.0 ± 2.1 | 143 ± 12 | 361.8 ± 54.7 | 5.7 ± 0.7 |

On the basis of the results obtained in test 1 it can be concluded that the resistance values for mixture A and mixture B range between the values of a low-density polyethylene (LDPE) and a random polypropylene (PP) copolymer.

Furthermore, FIG. 2 allows concluding that curves that do not have discontinuities are qualitatively obtained for sample A and sample B, i.e., it can be concluded that the recycled material obtained from multilayer PET containers according to the method of the present invention is homogenous.

Test 2:

Multilayer PET containers of post-industrial origin are used in test 2. Specifically, the recycled material is prepared following the method described in the description of the invention, and where preferably two compounds or mixtures (mixture C and mixture D) were elaborated from multilayer PET containers of post-industrial origin prepared according to the recycled material object of the present invention.

Likewise, in this test, mixture C and mixture D are obtained based on the use of a twin-screw extruder for the purpose of achieving good mixing and homogeneity of the recycled material obtained.

The table below specifies the elements making up mixture C and mixture D of test 2.

| Elements | Mixture C | Mixture D |
|---|---|---|
| Post-industrial multilayer PET containers | 50 | 85 |
| Epoxidised linseed oil | 5 | 2 |
| Rosin | 7 | 2 |
| Thermoplastic polyolefin matrix | 38 | 11 |

The mechanical characterization of sample C and sample D was performed by means of a tensile test (ISO 527, specimen 1BA, 5 kN load cell, and speed of 5 mm/min) and a Charpy impact test (ISO 179, notched. Method of ISO 179-1/1eA$^b$). Results obtained in the mechanical characterization are included in the following table.

| Sample | Maximum resistance (MPa) | Elastic modulus (MPa) | Elongation (%) | Impact energy (kJ/m$^2$) |
|---|---|---|---|---|
| Mixture C | 26.8 ± 1.3 | 814 ± 191 | 567 ± 91 | 3.7 ± 0.8 |
| Mixture D | 35.5 ± 1.9 | 1126 ± 98 | 552 ± 23 | 6.0 ± 0.6 |

From the results obtained, it can be concluded that mixture D is more resistant, given the maximum resistance of 35.5 MPa and the elastic modulus of 1126 MPa. Sample D also has excellent elongation at break (552%) and the energy it absorbs in the Charpy impact test is 2.4 KJ/m$^2$.

On the other hand, mixture C shows a more ductile behaviour, given that the elongation at break reaches 567% and the energy absorption by means of Charpy impact increases to 5.7 KJ/m$^2$.

In contrast, the resistance of mixture C decrease to 26.8 MPa and the modulus also decreases to 814 MPa.

From the results obtained in test 2, it can be concluded that the resistance values for mixture C and mixture D also range between the values of a low-density polyethylene (LDPE) and a random polypropylene (PP) copolymer.

The invention claimed is:

1. A method for obtaining a recycled material from multilayer PET containers of post-consumer and/or post-industrial origin, comprising the steps of:
   cleaning the multilayer PET containers using a soapy solution,
   separating film and/or labels from the multilayer PET containers, obtaining a clean multilayer PET material,
   crushing the clean multilayer PET material into pieces having a size of at least 1 mm,
   mixing the clean crushed multilayer PET material in a percentage of 50% to 85% of a total mixture, with a compatibilising mixture formed by at least a thermoplastic polyolefin matrix in a percentage of between 10% and 45% of the total mixture, a reagent of plant origin in a percentage of less than 7.5% of the total mixture, and a rosin-based tackifier in a percentage of less than 7.5% of the total mixture, and
   melting the mixture obtained in the preceding step by means of extrusion at a temperature of between 270° C. and 300° C. to obtain a continuous filament.

2. The method for obtaining a recycled material from multilayer PET containers according to claim 1, wherein the cleaning step is performed by means of mechanical stirring, at a temperature of at least 60° C. and wherein the soapy solution is formed by an aqueous solution with 2% soap, the soap being formed by 15% anionic surfactants and 5% non-ionic surfactants.

3. The method for obtaining a recycled material from multilayer PET containers according to claim 1, wherein in the crushing step the clean crushed multilayer PET material is obtained in the form of flakes with a size smaller than 5 mm by 5 mm.

4. The method for obtaining a recycled material from multilayer PET containers according to claim 1, further comprising the step of cutting by means of a pellet press to section the continuous filament obtained in the melting step, resulting in thermoplastic chippings.

5. The method for obtaining a recycled material from multilayer PET containers according to claim 1, further comprising a moulding step involving modelling of the continuous filament obtained in the melting step by means of a nozzle having a configuration such that it allows obtaining thermoplastic sheets and/or profiles.

6. A recycled material obtained from the method according to claim 1, wherein the recycled material is formed by clean crushed multilayer PET material in a percentage of 50% to 85% of the total mixture and a compatibilising mixture formed by at least a thermoplastic polyolefin matrix in a percentage of between 10% and 45% of the total mixture, a reagent of plant origin in a percentage of less than 7.5% of the total mixture, and a rosin-based tackifier in a percentage of less than 7.5% of the total mixture.

7. The recycled material according to claim 6, wherein the thermoplastic polyolefin matrix is made up of polyethylene and/or polypropylene.

8. The recycled material according to claim 6, wherein the thermoplastic polyolefin matrix is made up of copolymers of ionomers, ethylene-vinyl acetate, or random copolymers of polypropylene.

9. The recycled material according to claim 6, wherein the reagent of plant origin is an epoxidised soybean oil, an epoxidised linseed oil, and/or a maleinised linseed oil.

10. The recycled material according to claim 6, wherein the recycled material is in a format of thermoplastic chippings.

11. The recycled material according to claim 6, wherein the recycled material is in a format of thermoplastic sheets or profiles.

\* \* \* \* \*